(Model.)
J. M. SNODGRASS.
HAY LOADER.
No. 277,800. Patented May 15, 1883.
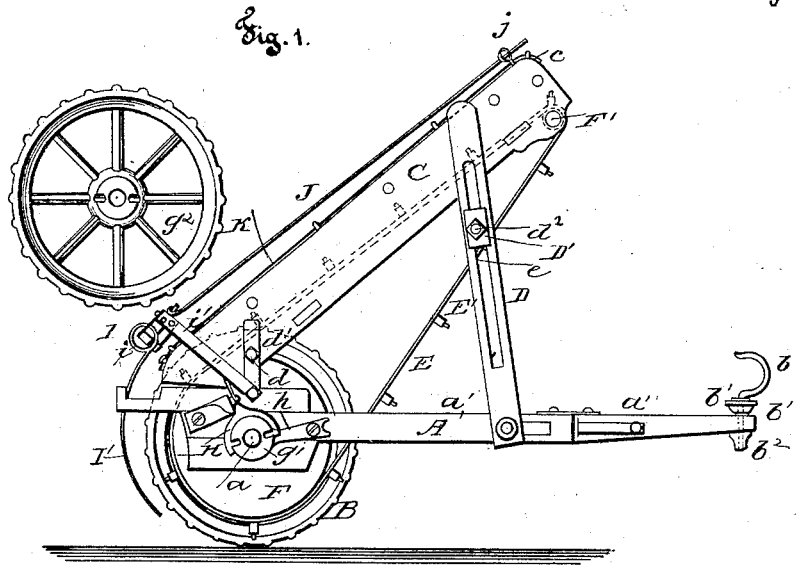
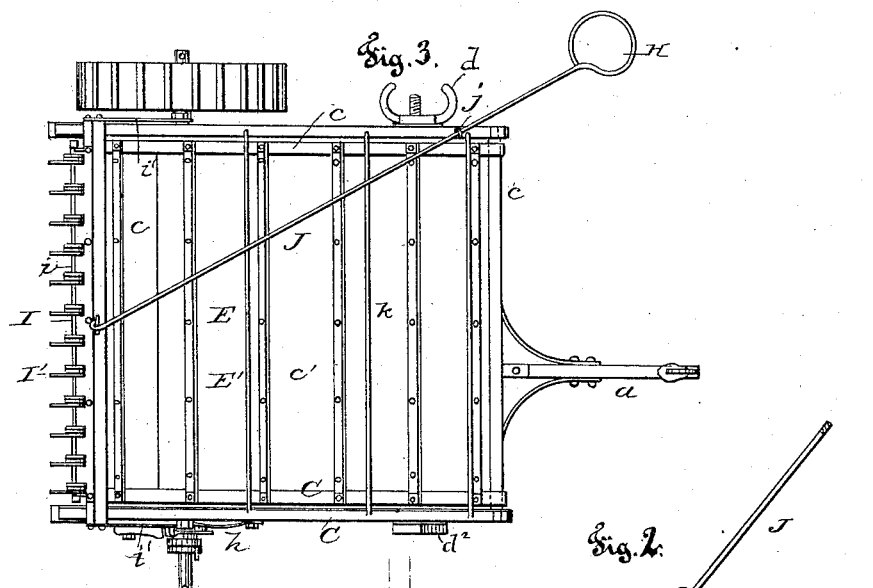
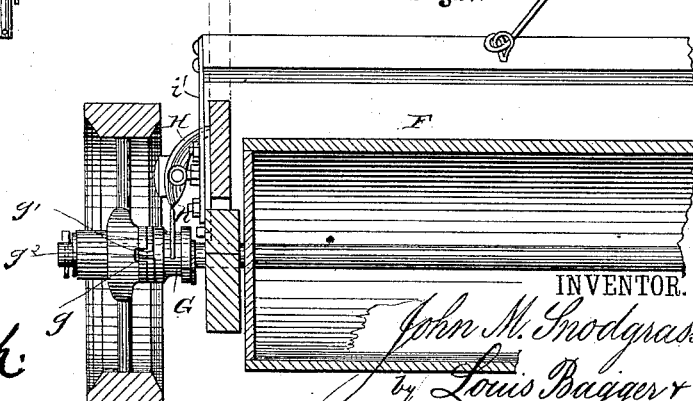
WITNESSES:
Fred. G. Dieterich
Jno. A. Madigan
INVENTOR.
John M. Snodgrass
by Louis Bagger & Co.
ATTORNEYS.

United States Patent Office.

JOHN M. SNODGRASS, OF MINNEAPOLIS, KANSAS.

HAY-LOADER.

SPECIFICATION forming part of Letters Patent No. 277,800, dated May 15, 1883.

Application filed June 17, 1882. (Model.)

*To all whom it may concern:*

Be it known that I, JOHN M. SNODGRASS, of Minneapolis, in the county of Ottawa and State of Kansas, have invented certain new and useful Improvements in Hay-Loaders; and I do hereby declare that the following is a full, clear, and exact description of the invention, which will enable others skilled in the art to which it appertains to make and use the same, reference being had to the accompanying drawings, which form a part of this specification, and in which—

Fgure 1 is a side elevation of my improved hay-loader. Fig. 2 is a vertical section, and Fig. 3 is a plan view thereof.

This invention has relation to an improvement in hay-loaders, having for its object to effect the ready raking and elevating of the hay or straw to load it into a wagon or "rack" to which the loader is connected; and it consists of the combination and arrangement of parts, substantially as hereinafter more fully set forth and claimed.

To put into practice my invention I employ a frame, A, having an axle, $a$, at its rear end, having the driving or transporting wheels B and a tongue or short bar, $a'$, projecting from its forward end. This bar or tongue is arranged to project on one side of the center of the front of the frame A, to permit it to be passed between the axle and bolster of the hay or straw rack, at one side of the central connecting-bolt thereof. A clamp or hooked bolt, $b$, effects the connecting of the tongue to the rack. This clamp consists of a short bolt having a hook to enter an aperture in the tongue-bar $a'$ from its under side, and fitted upon its other or straight portion washers or clamps $b'$ $b'$ and a nut, $b^2$, to secure it at the designated point between the axle and bolster of the rack.

C C are two side pieces, to and between which is fastened a frame, $c$, upon which is secured a board or boarded surface, $c'$, to prevent the hay or straw being elevated falling through the same. The side pieces, C, are pivoted, preferably by nutted bolts $d$, projecting from their outer surfaces through perforated upright plates $d'$, fastened to the rear ends of the side pieces of the frame A, to said frame to permit its being raised or lowered, as may be desired. The frame-pieces C are adjustably supported in position, when elevated, by standards D, which may also be pivoted to the forward ends of the side pieces of the frame A in any suitable manner, and by a rod, D', passed through slots $e$ in said standards, under and crosswise of the side or frame pieces, C. One end of the rod D' is headed, as at $d^2$, and to its other end is applied a thumb-nut, $d$, to permit the adjustment of the rod D' in raising and lowering the pieces C, with the elevating apron or belt supported between the same.

E is the endless apron or belt which elevates the hay or straw being loaded into the rack, consisting of two endless straps or belts having transversely connected to them bars or slats E', suitably spaced apart, and provided with short teeth or projections to assist the elevating of the hay or straw. This apron or belt passes around a cylinder, F, arranged upon and to revolve with the axle $a$, though removable therefrom, and around a roller or cylinder, F', journaled in boxes affixed to the upper ends of the side pieces, C. The endless apron or belt-cylinder F can be put in and out of operation by a sliding collar, G, arranged upon the axle $a$, and having a pin or projection, $g$, passing through an apertured ring, $g'$, fixed to the axle and projecting into an aperture or slot, $g^2$, in the hub of the driving-wheel. This collar is held under the action of a spring, $h$, against the fixed ring $g^3$, with its pin $g$ entering the slot $g^2$ of the driving-wheel hub to operate the elevator belt or apron.

H is a bifurcated lever, suitably pivoted to a bracket bolted to the rear end of the frame A, with its forked lower end straddling the collar G between flanges, forming a groove thereon, and its upper end extended a suitable distance upward and held inward toward and nearly in contact with the frame A.

I is the rake which rakes the straw or hay up to the lower end of the elevator-apron E. Its head is provided with a series of curved teeth or tines, I', whose upper ends are coiled into coiled springs $i$, to provide them with additional flexibility to lessen the danger of their breaking in the event of contact with an obstacle or obstacles. Said head is also connected by straps or bars $i'$ to the frame A. They are pivoted to the side pieces of said frame at points in line with a vertical plane passing in front of the lever H. The purpose of this is to enable one of said plates to act upon and throw the upper end of the lever H outward, and thus effect the disengagement of the driving-wheel from its axle, or to prevent the turning with the wheel of the axle simultaneously with the elevation of the rake. The said shifting action of the lever will put out of operation the elevator-belt by reason of disconnecting the axle from the driving-wheel.

J is the rake-elevating lever, which consists of a rod connected to the rake-head, and extended through an eye or staple, $j$, at the extreme upper end of one of the side pieces, C, to within convenient reach of the operator upon the rack. The side pieces, C, have secured to them cross-rods $k$ $k$, over which is spread a canvas or other suitable covering, K, to prevent the hay or straw being elevated from being affected by the wind. This cover or canvas K is detachably connected to the sides of the pieces C by headed pins or projections thereon passed through holes in the cover or canvas.

I claim and desire to secure by Letters Patent of the United States—

1. The clutch for hay-loaders, consisting of the grooved sleeve G, having projections $g$ and sliding on the axle, fixed slotted ring $g'$, the hub of the driving-wheel having slots $g^2$, spring $h$, and bifurcated curved lever H, adapted to clutch the grooved sleeve G and to be operated by the plates $i'$ $i'$ of the rake, substantially as set forth.

2. The combination of the frame A, adapted to be attached to the rear of a wagon, wheels B, adjustable frame C, elevator E F F', rake-head I, pivoted arms $i'$, rod J, lever H, grooved sleeve G, having projections $g$, ring $g'$, and slotted hub of wheel B, all constructed and combined to operate substantially as and for the purpose shown and set forth.

In testimony that I claim the foregoing as my own I have hereunto affixed my signature in presence of two witnesses.

JOHN MORRISON SNODGRASS.

Witnesses:
JAMES S. BURNHAM,
CHRISTOPHER W. STEPHENSON.